July 13, 1926.
E. H. FREEMAN
1,592,455
FLASH LIGHT MECHANISM
Filed July 23, 1923    3 Sheets-Sheet 1
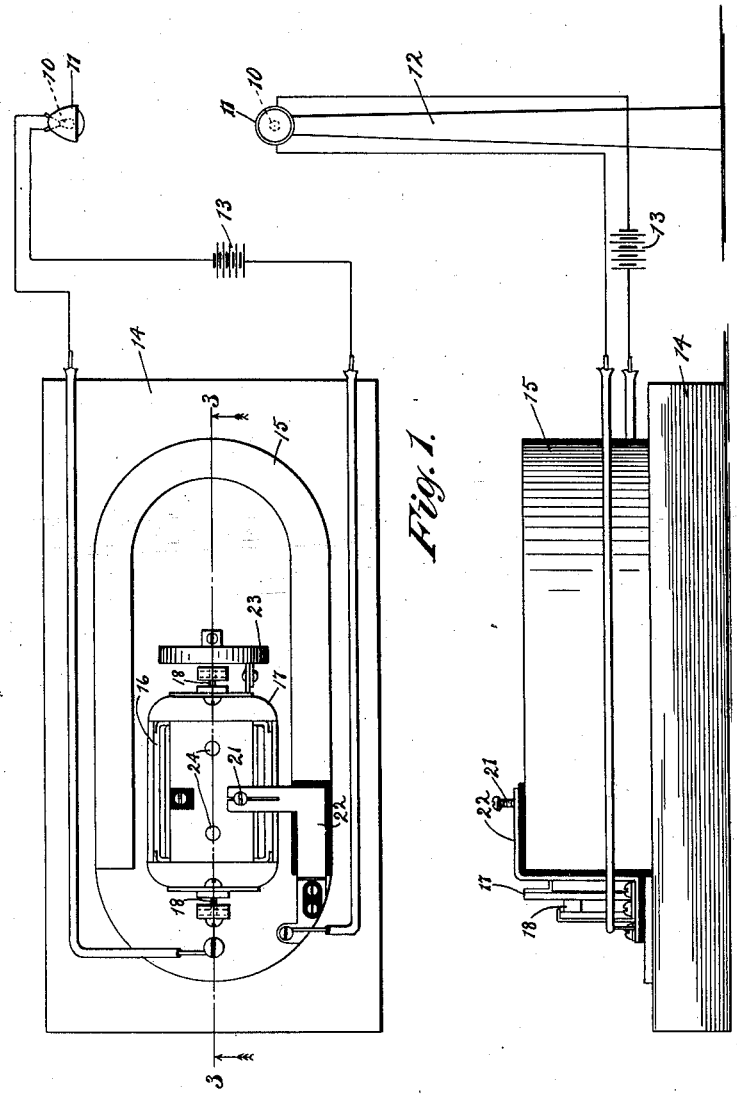
Inventor:
Ernest H. Freeman
By Gillson & Mann
Attys.

July 13, 1926.  
E. H. FREEMAN  
FLASH LIGHT MECHANISM  
Filed July 23, 1923   3 Sheets-Sheet 2
1,592,455
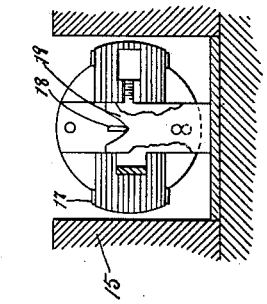
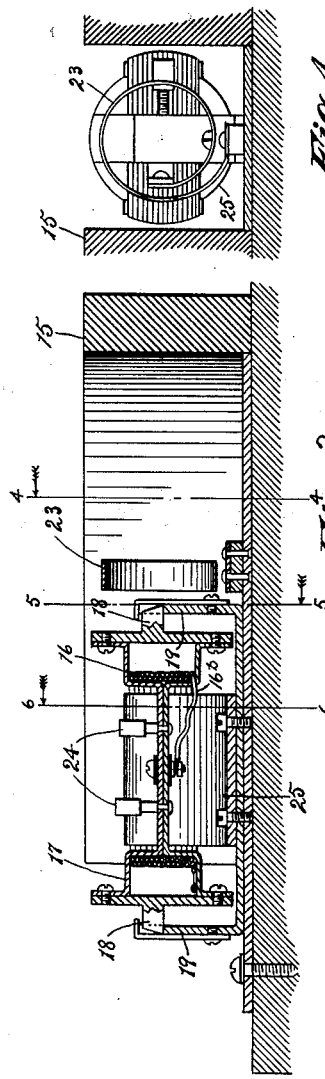
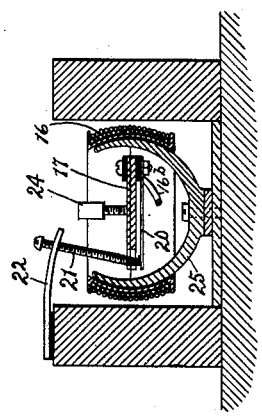
Inventor  
Ernest H. Freeman July 13, 1926.

E. H. FREEMAN 1,592,455

FLASH LIGHT MECHANISM

Filed July 23, 1923

3 Sheets-Sheet 3

Inventor:
Ernest H. Freeman
By Gillson & Mann
Attys.

Patented July 13, 1926.

1,592,455

UNITED STATES PATENT OFFICE.

ERNEST H. FREEMAN, OF WILMETTE, ILLINOIS.

FLASH-LIGHT MECHANISM.

Application filed July 23, 1923. Serial No. 653,392.

This invention relates to circuit opening and closing devices and is particularly adapted to be used for flash-light signals and the like, and one of the objects of the invention is the provision of new and improved mechanism for opening and closing an electric circuit.

Another object of the invention is the provision of a new and improved circuit opening and closing device that is adapted to be operated on a variable current and in which the opening of the circuit occurs when the current is at its minimum strength, thereby preventing sparking or arcing of the contact members.

Another object of the invention is the provision of a variable resistance element for producing a variable current and the association of suitable mechanism therewith and operated thereby for automatically opening and closing an electric circuit.

A further object of the invention is the provision of a circuit opening and closing device in which the mechanism is operated by a variable current produced by a variable resistance element and in which the said variable resistance element is utilized as an energy translating device, such as a filament for a signal light.

Still further objects of the invention are the provision of a new and improved signal device and operating mechanism therefor that is readily assembled; cheap to manufacture; simple in construction; efficient in operation; and one that is not likely to get out of order.

Figure 7:
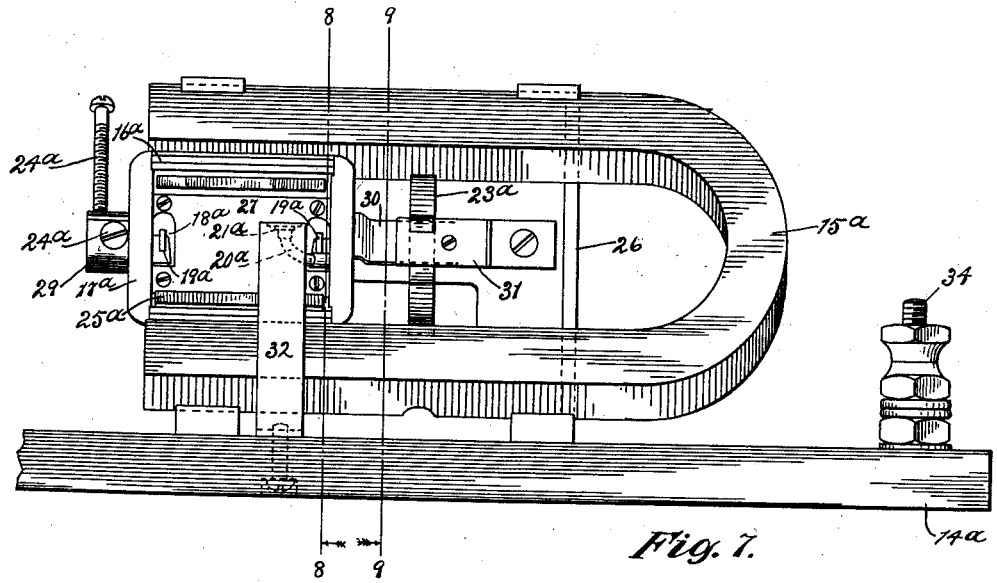
Figure 8:
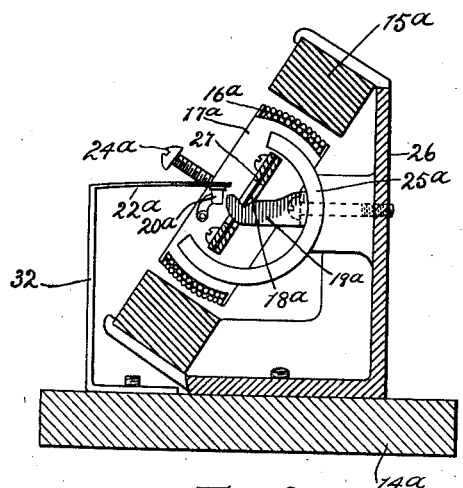
Figure 9:
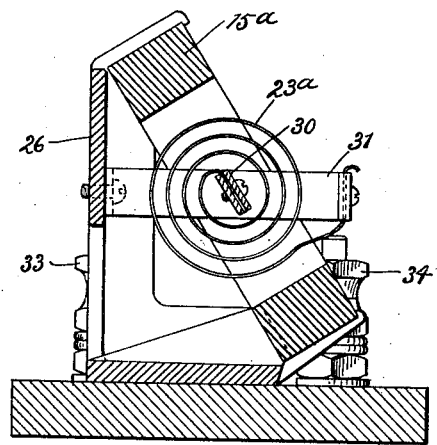

Other and further objects and advantages of the invention will appear from the following description, taken in connection with the accompanying drawings, in which Fig. 1 is a diagrammatic plan view of the mechanism; Fig. 2 is a diagrammatic front elevation of the same; Fig. 3 is a vertical section through the operating mechanism on the line 3—3 of Fig. 1; Figs. 4, 5 and 6 are vertical sections on the lines 4, 5 and 6 of Fig. 3; Fig. 7 is a side elevation of a slightly modified form of the device; and Figs. 8 and 9 are sectional views on lines 8—8 and 9—9, respectively, of Fig. 7.

In the form of the device selected to illustrate one embodiment of the invention, the circuit opening and closing mechanism is employed for operating a flashlight 10 which is preferably mounted on a suitable reflector 11, or behind a lens, on a post 12. This may be placed in series with a battery 13 and with an automatic circuit opening and closing device, which will presently be described and which is shown as mounted upon a base 14.

In certain forms of circuit opening and closing devices motors are employed for operating the movable contact while in others a vibrator, a solenoid or a thermostat is used for this purpose. Some of these devices are too costly to operate; some are too complicated in construction; while others are affected by climatic changes and conditions and are unreliable in their operation. In order to overcome these difficulties, the present construction contemplates the use of a simple electrically operated mechanism for operating the movable contact in one direction while suitable means such as resilient members or their equivalents are employed to render the device continuous and automatic.

In the form of the device disclosed, a magnet and a coil are employed, one of which is movable relatively to the other. Preferably the coil is movable, but not necessarily so. As shown on the drawings, a permanent U-shaped magnet 15 which may be termed a stator member is mounted on the base 14 and has a coil 16 mounted between the outer ends of the permanent magnet, upon a frame 17, the latter being carried upon knife edges 18 and supports 19. By mounting the movable portion of the device on knife edges the frictional resistance of the movable frame is reduced to a minimum, thereby increasing the efficiency of the device. One end of the coil 16 is grounded upon the frame 17, while the other is connected to a spring contact 20, as shown in Fig. 6. This spring contact is secured to the center of the frame 17, and insulated therefrom, and is adapted to make contact with the adjusting-screw 21, which is carried by a plate 22, which in turn is connected to the wire from the battery 13, as shown in Fig. 1.

A resilient member 23 which may be in the form of a light coiled spring as shown in Fig. 4 tends to hold the contacts 20 and 21 normally in engagement. One end of the spring 23 is attached to the coil frame 17 and the other end is fastened to the base 14. Counterbalancing weights 24 are also carried by the frame 17 for regulating the balance of the frame.

If it is desired to increase the magnetic flux across the ends of the permanent magnet, this may be accomplished in any well known manner as by providing a fixed hollow core 25 of soft iron or the like, which is cylindrical in form and which lies within the coil 16, as shown in Figs. 1 and 6.

Means are provided for operating the circuit opening and closing device on a variable current. In the form of the device disclosed the arrangement is such that the current rapidly decreases on closing the circuit but it is understood it may be otherwise. In the embodiment selected to illustrate the invention means are provided for producing a variable current and for opening the circuit at the current's minimum strength, whereby sparking or arcing of the contacts is prevented or greatly reduced during the operation of the device, and the life of the contacts thereby prolonged.

Any suitable means may be employed for this purpose. Preferably an element having a variable resistance is employed in the circuit. This resistance element may be located anywhere in the circuit. In the construction shown wherein the circuit opening and closing device is employed to operate a flash or signal light the resistance element, for convenience and economy, may take the form of the filament for the lamp, although it is understood that it is immaterial what form of filament is employed for the lamps so long as an element having a sufficient variable resistance be employed somewhere in the circuit.

It is a well known fact that with tungsten or other metal filaments the resistance of the filament is many times as great when hot as it is when cold. Consequently at the instant of closing a circuit, which is of relatively low resistance, wherein a tungsten filament lamp is placed, the amount of current at the instant of closing the circuit is several times that existing after the lamp has been brought up to its normal candle power.

This fact is made use of in the present invention by passing the current through the coil 16 in such a direction as to tend to turn it in a clockwise direction, as shown in Fig. 6. The circuit is closed by a movement of the coil 16 carrying the contact 20 into engagement with the screw 21, the movement being caused by the spring 23 in this direction and the strong current existing momentarily due to the low resistance of the tungsten lamp when cold causes the coil to be turned still further, thereby deflecting the spring 20 and storing up energy therein. While the coil 16 is being brought to rest by the screw 21 acting on the spring 20, the lamp 10 is rapidly heating up and as it does so the current drops rapidly due to its increased resistance when hot. As this current decreases, the torque, tending to turn the coil 16 in a clockwise direction, correspondingly decreases until a point is reached where the force due to the energy stored up in the spring 20 more than counter-balances the torque due to the current and the coil is forced back in a counter-clockwise direction under the impulse of the spring 20, and this spring is carried back by the coil and out of contact with the screw 21, thereby breaking the circuit.

This movement of the coil in a counter-clockwise direction continues until stopped by the action of the spring 23, which again forces the coil 16 back until the spring 20 again makes contact with the screw 21, when the cycle, as above described, is reenacted.

It will thus be seen that by each oscillation of the coil 16, the cold lamp 10 is brought up to full brilliancy, the lamp circuit opened and the lamp allowed to cool down. An automatic flash lamp is thus provided, which gives a brilliant flash at regular intervals and which requires substantially no attention.

In Figs. 7, 8 and 9 are shown a modified form of the device in which the knife edge bearings for supporting the movable coil are arranged in the plane of the coil and the resilient and non-resilient contact members are interchanged. By this arrangement the plane of the coil 16ª is substantially vertical thus necessitating arranging the magnet 15ª at a slight inclination. The magnet is held in position by a suitable holding bracket 26 mounted on the base 14ª. The web 27 of the frame 17ª may be provided with knife edges 18ª for engaging suitable bearings carried by the supports 19ª secured to the holding bracket 26. The soft iron core 25ª may also be supported from the holding bracket 26 and is arranged in the same relative position as the core 25 in Figs. 1 to 6.

The coil supporting frame 17ª may be formed from sheet metal stampings and it is provided with extensions 29 and 30 at each end thereof outwardly of the coil. The extension 29 is adapted to adjustably support inertia weights such as the screws 24ª while the extension 30 is utilized to hold one end of the spring 23ª. The outer end of the spring 23ª is adjustably held in the outer end of a bracket 31 as by being clamped therein.

The frame 17ª is provided with an insulated contact member 20ª to which one end of the coil 16ª is connected. The other contact member 21ª is yieldingly supported by the spring member 22ª. The member 22ª is insulated from the metallic parts of the device in any suitable manner as by being supported by the bracket 32 which may be mounted on the base 14ª. Suitable conductors connect the bracket 32 with the terminal 33 and the bracket 26 with the terminal 34.

The operation of the device is substantially the same as that of the construction shown in Figs. 1 to 6, inclusive, when the battery and resistance element are connected in the same manner. If, however, the leads of the battery be interchanged the current will tend to turn the coil 16 counter-clockwise and open the circuit. When the circuit is opened the spring 23ª will return the coil to again close the circuit and thus complete a cycle of operation. With this arrangement a variable resistance element in the circuit is obviously not necessary to the operation of the device.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim as my invention:

1. A flasher comprising in combination, an electric lamp adapted to change its resistance as it becomes heated, a switch in circuit therewith comprising a pair of contacts, yielding means supporting one of said contacts, means normally pressing one of said contacts toward the other thus holding said switch normally closed, electromagnetic means in circuit with said lamp and switch acting upon initiation of current in the circuit to store energy in said yielding means and by change of current due to change of resistance of said lamp allowing the rebound of the yielding means by the stored energy to momentarily open said switch.

2. A flasher comprising in combination, a metallic filament lamp, a switch in circuit therewith comprising a pair of contacts, resilient means supporting one of said contacts, a coil mounted to oscillate in a magnetic field coacting with said contacts and so connected in circuit with said lamp and switch as to cause increased pressure between said contacts with strain of said resilient means when current is initiated in said circuit, means acting upon said coil to normally press one of said contacts against the other, rebound of said resilient means momentarily separating said contacts when current in said coil drops upon heating of the filament in said lamp.

3. A flasher comprising in combination, a metallic filament lamp, a switch in circuit therewith comprising a relatively fixed and relatively movable contact, resilient means supporting one of said contacts, a coil mounted to oscillate in a magnetic field carrying said relatively movable contact and so connected in circuit with said lamp and switch as to cause increased pressure between said contacts with strain of said resilient means when current is initiated in said circuit, and means acting upon said coil to press one of said contacts normally against the other, rebound of said resilient means momentarily separating said contacts when current in said coil drops upon heating of the filament in said lamp.

4. A flasher comprising in combination, a metallic filament lamp, a permanent magnet, a coil mounted to oscillate between the poles of said magnet on an axis parallel with the legs thereof, a normally closed switch in circuit with said lamp comprising a fixed contact, and a spring supported contact carried by the mounting of said coil, said coil connected in circuit with said switch and lamp to rotate so as to strain the spring against the fixed contact upon initiation of current in said circuit, resilient means urging rotation of the coil to hold the switch closed, rebound of the spring acting to momentarily open said switch against the pressure of said resilient means when current in the coil drops as the lamp becomes heated.

5. In combination, an electric circuit including a conductor element the resistance of which varies as said element becomes heated, a pair of contacts in said circuit, yielding means supporting one of said contacts, means normally pressing one of said contacts toward the other, and means in circuit with said conductor element operating upon the initiation of the current to move one of said contacts toward the other against said yielding means and by change of current due to change in resistance in said conductor permitting rebound of the yielding means to open said circuit.

6. In a flasher, in combination, an electric lamp, a normally closed cut-out switch in series with the lamp, and means controlled by the circuit for opening the switch as the lamp resistance increases by reason of the heating of its translating element.

7. In a device of the class described, an electric circuit including a conductor varying in resistance at different temperatures for causing a variable current in said circuit, a normally closed switch in the circuit, and means including mechanism controlled by the variation of current through said conductor for opening and closing said switch.

8. In a device of the class described, a stator member, an armature member movably mounted in proximity to said first named member, an electric circuit including a source of electric energy and a winding for one of said members for causing said armature to move in the direction of closing the circuit when the circuit through said winding is closed, a switch in said circuit, said circuit including a conductor varying in resistance at different temperatures for producing a variable current through said winding, and means for causing said armature to move in the direction to open said switch when the strength of the current through said winding reaches a predetermined amount.

9. In a device of the class described, an electric circuit including a source of electricity, circuit breaker mechanism including a movable contact member in said circuit, said mechanism adapted to be operated by a variable current through said contact member, means for operating said mechanism, including a conductor varying in resistance at different temperatures and producing a variable current through said contact member, and means for automatically restoring the parts to their initial position after said mechanism has been operated by said variable current.

10. In combination, a normally closed electric circuit including a source of electrical energy, a variable current operated mechanism including a switch for opening said circuit, an electric conductor means having a low resistance when cool and a high resistance when hot, for producing a variable current for operating said mechanism, and means for automatically closing said switch, said conductor means being in series with said mechanism.

11. In combination, an electric circuit, an electric lamp in said circuit having a low resistance when cool and a high resistance when hot for producing a variable current, and means including control mechanism operated by said current for opening and closing said circuit for causing said lamp to emit series of flashes.

12. An electric circuit including a lamp having a filament the resistance of which varies as the filament heats up, a source of electricity, and mechanism operable by the change of current due to said change of resistance of the filament, to break said circuit, said filament being in series with said source of electricity.

13. An electric circuit including a conductor, the resistance of which varies as the conductor heats up, a source of electricity, and mechanism operable by the change of current due to said change of resistance of said conductor to interrupt said current through said mechanism when the same reaches a low intensity.

14. An electric circuit including a lamp having a filament, the resistance of which varies as the filament heats up, a source of electricity, mechanism operable by the change of current due to said change of resistance of the filament to break said circuit, and means for returning said circuit to a normally closed position whereby said filament will emit series of flashes in rapid succession.

15. In a device of the class described, an electric circuit including coil means, means for producing a magnetic field, mechanism for movably supporting one of said means in the field of the other, a source of electrical energy and a pair of contact members for opening and closing said circuit through said coil, means for resiliently supporting one of said contact members and resilient means for normally maintaining said members in engagement.

16. In a device of the class described, a magnet, a coil, knife edge bearings for pivotally mounting said coil to oscillate in the field of said magnet, a contact member, means including a conductor for connecting one end of said coil to said member, a movable contact member operated by said coil, means for resiliently supporting one of said contact members, and resilient means for normally maintaining said members in engagement.

17. In a device of the class described, an electric circuit, a conductor the resistance of which increases as the same heats up, in said circuit, and mechanism, including means in said circuit, for interrupting the flow of electricity through said means when the same reaches its minimum intensity.

ERNEST H. FREEMAN.